UNITED STATES PATENT OFFICE.

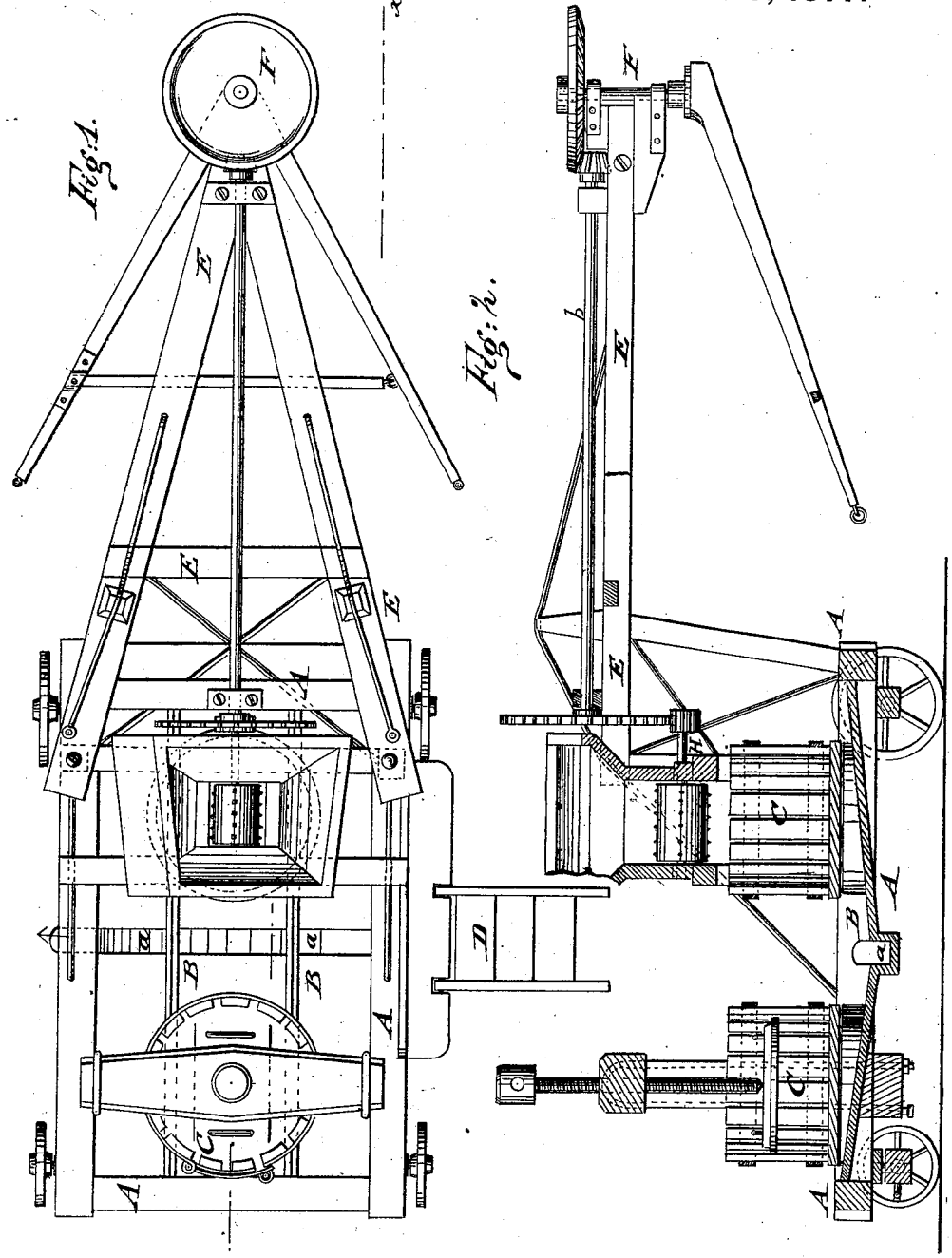

LADORE V. SIKES, OF EAST OTTO, NEW YORK.

IMPROVEMENT IN PORTABLE CIDER-MILLS.

Specification forming part of Letters Patent No. 196,837, dated November 6, 1877; application filed September 14, 1877.

*To all whom it may concern:*

Be it known that I, LADORE V. SIKES, of East Otto, in the county of Cattaraugus and State of New York, have invented a new and Improved Portable Cider-Mill, of which the following is a specification:

In the accompanying drawings, Figure 1 represents a top view, and Fig. 2 a side elevation, partly in section on line $x\ x$, Fig. 1, of my improved horse-power cider-mill.

Similar letters of reference indicate corresponding parts.

This invention relates to an improved horse-power cider-mill which is readily moved from farm to farm, and by which the entire crop may be quickly ground and pressed in a convenient and economical manner.

The invention consists of a wheeled platform, supporting two curbs, one below the grinding-mill, the other below the press-screw.

The curbs run on track-rails from grinding-mill to press, as required.

By referring to the drawings, A represents a platform of suitable strength, that is placed on wheels and drawn by horses, in the usual manner. On the platform are supported and guided on longitudinal track-rails B two curbs, C, which, by their grooved bottoms, may be readily moved from one end of the platform to the other. That part of the platform inside of the outer inclosing-frame is inclined toward a central lateral channel or gutter, $a$, with exit-spout at one side for the cider to run off into a suitable receptacle, the rails being recessed at the gutter for the passage of the cider. Above one curb C is supported, on strong side standards, a cross-beam for the screw of the press-head, while above the other curb C is arranged the receiving-hopper and grinding-roller of the mill.

A step-ladder, D, hinged to a platform at the side opposite the exit-spout for the cider, admits the easy mounting of the platform and the supply of the mill with fruit. The step-ladder may be thrown up on the main platform after use.

The mill-supporting standards, together with strong end standards and suitable brace-rods, support a horizontal overhead frame, E, that extends back of the platform, and supports at the end the master-wheel and shaft of a horse-power, F.

The horses are hitched to arms, of which one is rigidly applied to a socket of the shaft, the other hinged to fold up on the fixed arm after use. The arms are braced by a cross-piece and lock-pin, and turn, when the horses are hitched thereto, the master-wheel, and thereby an intermeshing pinion and driving-shaft, $b$, supporting in bearings of the overhead frame E. A gear-wheel at the opposite end of the driving-shaft meshes with a pinion of the grinding-cylinder, and keeps the same in motion.

When the first curb is filled with ground fruit, the same is moved on the rail below the press, and an empty curb placed below the grinding-mill, so that no interruption takes place. The pomace in the first curb is then pressed and the cake taken out, the curb being then ready again to be filled by the mill, while the full curb is moved below the press, and so on, the curbs being alternately changed from the grinding-mill to the press, and thereby the grinding and pressing of the fruit and the making of cider accomplished in quick manner.

The apparatus may be readily moved to the place required, and set instantly to work by hitching the horses to the horse-power, forming thus a compact, portable, and time-saving cider mill and press for agricultural purposes.

Having thus described my invention, I claim as new and desire to secure by Letters Patent—

A cider-mill in which the press and grinder are arranged at opposite ends of a track, B, on a platform inclined from said ends to the middle, and there provided with gutter $a$, as shown and described.

LADORE V. SIKES.

Witnesses:
STILLMAN R. SIKES,
ANNA R. TUTHILL.